United States Patent
Hwang

(10) Patent No.: US 7,852,438 B2
(45) Date of Patent: Dec. 14, 2010

(54) TRANSFLECTIVE TYPE LIQUID CRYSTAL DISPLAY DEVICE AND METHOD FOR FABRICATING THE SAME

(75) Inventor: Han Wook Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 502 days.

(21) Appl. No.: 10/968,260

(22) Filed: Oct. 20, 2004

(65) Prior Publication Data

US 2005/0140871 A1    Jun. 30, 2005

(30) Foreign Application Priority Data

Dec. 29, 2003    (KR)    ...................... 10-2003-0098921

(51) Int. Cl.
*G02F 1/1335* (2006.01)
*G02F 1/136* (2006.01)
*H01L 29/04* (2006.01)
*G09G 3/36* (2006.01)

(52) U.S. Cl. ............................. 349/114; 349/42; 349/43; 349/46; 349/47; 257/59; 257/72; 345/92

(58) Field of Classification Search .................. 349/114, 349/42–47; 345/92; 257/59, 72
See application file for complete search history.

(56) References Cited

U.S. PATENT DOCUMENTS

| | | | | |
|---|---|---|---|---|
| 6,306,692 B1 * | 10/2001 | Seo et al. | ...................... | 438/149 |
| 6,466,280 B1 * | 10/2002 | Park et al. | ...................... | 349/43 |
| 6,509,616 B2 * | 1/2003 | Yamazaki | ..................... | 257/390 |
| 6,654,076 B2 * | 11/2003 | Ha et al. | ........................ | 349/43 |
| 6,809,785 B2 * | 10/2004 | Fujino | ........................ | 349/114 |
| 6,864,945 B2 * | 3/2005 | Fujimori et al. | ............. | 349/156 |
| 6,967,702 B2 * | 11/2005 | Ishii et al. | .................... | 349/123 |
| 7,247,878 B2 * | 7/2007 | Park et al. | ...................... | 257/40 |
| 2002/0033918 A1 * | 3/2002 | Shigeno et al. | ............. | 349/114 |
| 2002/0093609 A1 * | 7/2002 | Baek et al. | .................. | 349/113 |
| 2003/0007114 A1 * | 1/2003 | Kim et al. | .................... | 349/113 |
| 2003/0030768 A1 * | 2/2003 | Sakamoto et al. | ........... | 349/113 |
| 2003/0142253 A1 * | 7/2003 | Takenaka | .................... | 349/113 |
| 2004/0233361 A1 * | 11/2004 | Ha et al. | ....................... | 349/114 |

FOREIGN PATENT DOCUMENTS

| | | |
|---|---|---|
| CN | 1363853 | 8/2002 |
| CN | 1395140 A | 2/2003 |
| JP | 2003-195275 | 7/2003 |

* cited by examiner

*Primary Examiner*—Hoan C Nguyen
(74) *Attorney, Agent, or Firm*—Morgan, Lewis & Bockius LLP

(57) ABSTRACT

A transflective type LCD device includes a substrate having gate and data lines crossing each other to define pixel regions, a reflective part and a transmitting part in each pixel region, a pixel electrode in the reflective part and the transmitting part of the pixel region, a reflective electrode in the reflective part of the pixel region, a thin film transistor having source and drain regions at a crossing of the gate and data lines for transmitting a signal of the data line to the pixel electrode in accordance with a signal of the gate line, and an electrode electrically connecting the source region of the thin film transistor with a data electrode of the data line.

9 Claims, 8 Drawing Sheets

TRANSFLECTIVE TYPE LIQUID CRYSTAL DISPLAY DEVICE AND METHOD FOR FABRICATING THE SAME

This application claims the benefit of the Korean Application No. P2003-98921, filed on Dec. 29, 2003, which is hereby incorporated by reference.

BACKGROUND OF THE INVENTION

1. Field of the Invention

The present invention relates to a liquid crystal display (LCD) device, and more particularly, to a transflective type LCD device.

2. Discussion of the Related Art

Demands for various display devices have increased with development of information society. Accordingly, many efforts have been made to research and develop various flat display devices, such as liquid crystal display (LCD), plasma display panel (PDP), electroluminescent display (ELD), and vacuum fluorescent display (VFD). Some species of flat display devices have already been used as displays in various types of equipment.

Among the various flat display devices, liquid crystal display (LCD) devices have been most widely used due to the advantageous characteristics of thin profile, light weight, and low power consumption. Typically, a LCD device is provided as a substitute for a Cathode Ray Tube (CRT). In addition to mobile type LCD devices, such as a display for a notebook computer, LCD devices have been developed for computer monitors and televisions to receive and display broadcasting signals.

Despite various technical developments in the LCD technology for applications in different fields, research in enhancing the picture quality of the LCD device has been, in some respects, lacking as compared to other features and advantages of the LCD device. In order to use the LCD devices in various fields as a general display, LCD devices should have a high quality picture, such as high resolution and high luminance with a large-sized screen, while still maintaining a light weight, thin profile, and low power consumption.

Generally, the LCD device includes an LCD panel for displaying an image and a driver for supplying driving signals to the LCD panel. In addition, the LCD panel includes first and second substrates bonded to each other. A liquid crystal layer is formed in a cell gap between the first and second substrates. The first substrate (often referred to as a TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by crossings of the gate and data lines, and a plurality of thin film transistors enabled according to signals supplied to the gate lines for transmitting signals from the data lines to the pixel electrodes. Also, the second substrate (often referred to as a color filter array substrate) includes a black matrix layer that prevents light from portions of the first substrate except at the pixel regions, an R/G/B color filter layer for displaying various colors, and a common electrode for producing the image.

The LCD device does not emit light in and of itself. Thus, the LCD device requires an additional light source for emitting light. Especially, in the case of a transmitting type LCD device, it is necessary to provide an additional light source for emitting and guiding light at the rear of the LCD panel. However, the backlight is maintained in the turned-on state during driving the LCD device, thereby increasing power consumption of the LCD device.

SUMMARY OF THE INVENTION

Accordingly, the present invention is directed to a transflective type LCD device and a method for fabricating the same that substantially obviates one or more problems due to limitations and disadvantages of the related art.

An object of the present invention is to provide a transflective type LCD device and a method for fabricating the same, having a dual cell gap to decrease power consumption by using light emitted from a backlight in the dark surroundings, and using ambient light in the bright surroundings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a transflective type LCD device includes a substrate having gate and data lines crossing each other to define pixel regions, a reflective part and a transmitting part in each pixel region, a pixel electrode in the reflective part and the transmitting part of the pixel region, a reflective electrode in the reflective part of the pixel region, a thin film transistor having source and drain regions at a crossing of the gate and data lines for transmitting a signal of the data line to the pixel electrode in accordance with a signal of the gate line, and an electrode electrically connecting the source region of the thin film transistor with a data electrode of the data line.

In another aspect of the present invention, a method for fabricating a transflective type LCD device on a substrate having pixel regions includes forming a reflective part and a transmitting part in each pixel region, forming a pixel electrode in the reflective part and the transmitting part of the pixel region, forming a reflective electrode in the reflective part of the pixel region, forming a thin film transistor having source and drain regions at a crossing of the gate and data lines for transmitting a signal of the data line to the pixel electrode in accordance with a signal of the gate line, and forming an electrode electrically connecting the source region of the thin film transistor with a data electrode of the data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Hereinafter, a transflective type LCD device according to embodiments of the present invention will be described with reference to the accompanying drawings.

Figure 1:
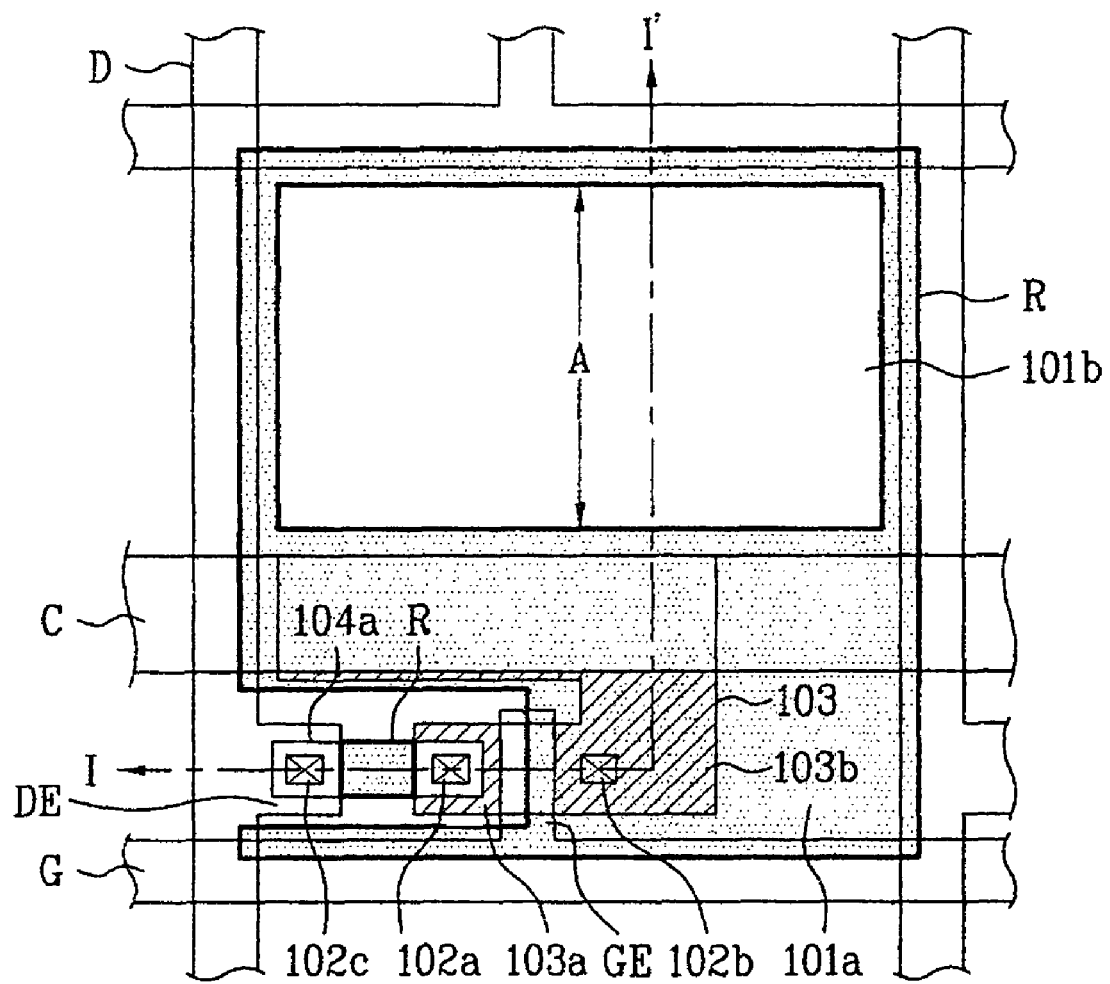
FIG. 1 is a plane view of one pixel region of a transflective type LCD device according to an embodiment of the present invention.
Figure 2:
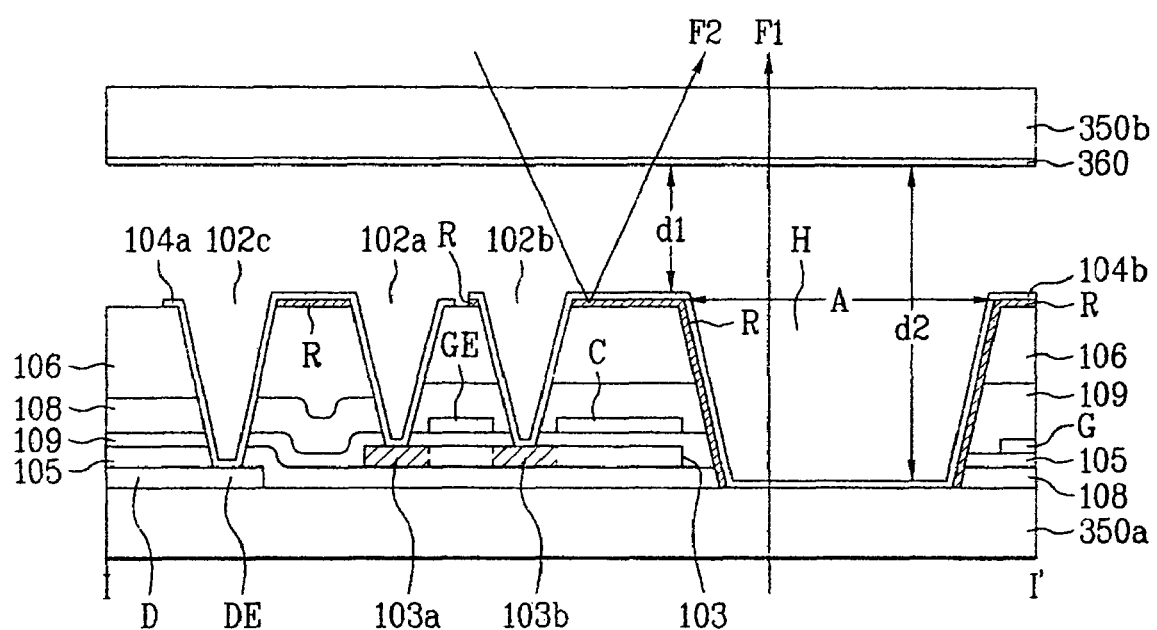
FIG. 2 is a cross-sectional view along I-I' of FIG. 1.

FIG. 1 is a plane view of one pixel region of a transflective type LCD device according to an embodiment of the present invention. FIG. 2 is a cross-sectional view along I-I' of FIG. 1.

In the transflective type LCD device as shown in FIG. 1 and FIG. 2, a gate line G is formed over a first substrate 350a. A data line D is formed in perpendicular to the gate line G on the first substrate 350a. Then, a plurality of pixel regions are formed at each crossing of the gate line G and the data line D. Each pixel region has a reflective part 101a and a transmitting part 101b.

Between the first and second substrates 350a and 350b, the data line D, a data electrode DE, a data insulating layer 108, a semiconductor layer 103, a gate insulating layer 105, a gate electrode GE, a common electrode line C, an insulating interlayer 109, and an organic insulating layer 106, a reflective electrode R, a pixel electrode 104b, and a transparent electrode 104a are formed. More specifically, the data electrode DE extends from the data line D and protrudes toward the pixel region. The data insulating layer 108 is formed over the entire surface of the first substrate 350a including the data line D and the data electrode DE. Then, the semiconductor layer 103 having source and drain regions 103a and 103b is formed on the data insulating layer 108. The gate insulating layer 105 is formed over the entire surface of the first substrate 350a including the semiconductor layer 103, and the gate electrode GE protruding the gate line G is formed on the gate insulating layer 105 corresponding to a channel region provided between the source and drain regions 103a and 103b of the semiconductor layer 103.

The common electrode line C partially overlaps the semiconductor layer 103 and is parallel with the gate line G. The insulating interlayer 109 and the organic insulating layer 106 are sequentially formed on the entire surface of the first substrate 350a including the gate electrode GE and the common electrode line C. The reflective electrode R having an open portion A corresponding to the transmitting part 101b is formed on the organic insulating layer 106. The pixel electrode 104b is connected with the drain region 103b of the semiconductor layer 103, and is formed on the entire surface of the reflective electrode R including the transmitting part 101b. The transparent electrode 104a connects the source region 103a of the semiconductor layer 103 with the data electrode DE.

A second substrate 350b is positioned opposite to the first substrate 350a. A color filter 360 is formed on the second substrate. The color filter layer 360 receives light F2 reflected from the reflective part 101a and light F1 transmitted through the transmitting part 101b to display colors.

As shown in FIG. 1, the reflective electrode R partially overlaps the gate line G and the data line D. A transmitting hole H (shown in FIG. 2) is formed below the open portion A of the reflective electrode R by removing portions of the data insulating layer 108, the gate insulating layer 105, the insulating interlayer 109, and the organic insulating layer 106. The transmitting hole H has a depth that exposes a portion of the first substrate 350a. A cell gap depth d2 from the bottom of transmitting hole H at the first substrate 350a to the second substrate 350b is twice as great as a cell gap d1 from the top of the reflective part 101a of the first substrate 350a to the second substrate 350b. The path of light F1 passing through the transmitting hole H corresponds to the path of light F2 reflected by the reflective electrode R of the reflective part. Thus, a phase difference of the light passing through the transmitting part 101b and the reflective part 101a is almost same. The aforementioned structure of having the two kinds of cell gap depths d1 and d2 is referred to as a dual cell gap structure.

The pixel electrode 104b is formed in the pixel region, and is electrically connected with the drain region 103b of the semiconductor layer 103 via a drain contact hole 102b penetrating through the gate insulating layer 105, the insulating interlayer 109, and the organic insulating layer 106, as shown in FIG. 2. The transparent electrode 104a is formed on the data electrode DE and the source region 103a of the semiconductor layer 103 such that the transparent electrode 104a electrically connects the data electrode DE with the source region 103a of the semiconductor layer 103 via a source contact hole 102a and a data contact hole 102c. The source contact hole 102a penetrates through the gate insulating layer 105, the insulating interlayer 109, and the organic insulating layer 106. The data contact hole 102c penetrates through the data insulating layer 108, the gate insulating layer 105, the insulating interlayer 108, and the organic insulating layer 106.

The transflective type LCD device according to an embodiment of the present invention uses ambient light F2 in the bright surroundings. That is, the light F2 incident on the reflective part 101a is reflected from the reflective electrode R of the reflective part 101a, and then the light passes through the color filter layer 360 of the second substrate 350b, thereby displaying luminance. Otherwise, in dark surroundings, the transflective type LCD device according to an embodiment of the present invention uses the light F1 emitted from a backlight (not shown). That is, the light F1 emitted from the backlight unit passes through the transmitting hole H of the transmitting part 101b, and the color filter layer 360 of the second substrate 350b, thereby displaying luminance.

A method for fabricating the transflective type LCD device according to an embodiment of the present invention will be described while referring to FIG. 3A to FIG. 3F as follows. FIG. 3A to FIG. 3F are cross-sectional views of a method for fabricating the transflective type LCD device according to an embodiment of the present invention.

Figure 3A:
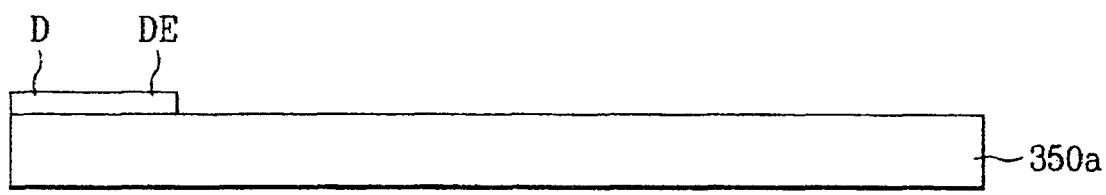
FIG. 3A to FIG. 3F are cross sectional views of a method for fabricating a transflective type LCD device according to an embodiment of the present invention.

First, a first substrate 350a having a plurality of pixel regions is prepared. More particularly, each pixel region has a reflective part 101a and a transmitting part 101b. Subsequently, as shown in FIG. 3A, a metal layer, such as aluminum Al, is deposited on the first substrate 350a, and selectively patterned by photolithography (using a first mask) to form the data line D and the data electrode DE extending from the data line D toward the pixel region.

Figure 3B:
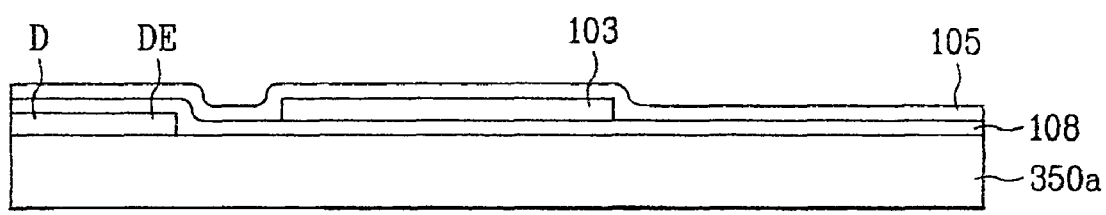

Subsequently, as shown in FIG. 3B, an insulating layer, such as silicon oxide $SiO_x$ or silicon nitride $SiN_x$ is formed over the entire surface of the first substrate 350a including the data line D and the data electrode DE. Also, a silicon layer is deposited over the entire surface of the data insulating layer 108, and then is selectively patterned by photolithography (using a second mask) to form the island-shaped semiconductor layer 103 on the data insulating layer 108. An insulating layer of silicon oxide ($SiO_x$) or silicon nitride ($SiN_x$) is deposited over the entire surface of the first substrate 350a including the semiconductor layer 103 to form the gate insulating layer 105.

Figure 3C:
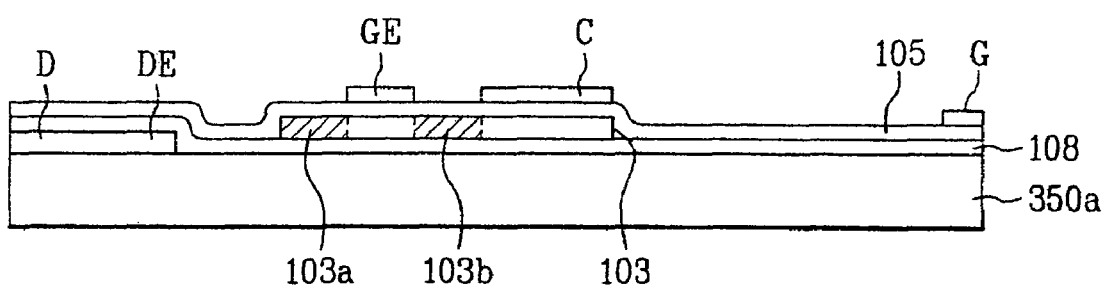

Referring to FIG. 3C, a metal layer, such as aluminum (Al), aluminum neodymium (AlNd), and chrome (Cr), is deposited over the entire surface of the gate insulating layer 105, and then is selectively patterned by photolithography (using a third mask) to form the gate line G perpendicular to the data line D and the gate electrode GE positioned on the gate insulating layer 105 in correspondence with the channel region of the semiconductor layer 103. Simultaneously, the common electrode line C is formed on the gate insulating layer 105 to overlap the semiconductor layer 103.

Next, both sides of the semiconductor layer 103 are exposed by using the gate electrode GE and the common electrode line C as a mask, and then impurity ions are implanted into the both sides of the semiconductor layer 103. A middle portion of the semiconductor layer 103 that serves as a channel region is covered with the gate electrode GE. The sides of the semiconductor layer serve as the source and drain regions 103a and 103b after implantation of impurity ions.

Figure 3D:
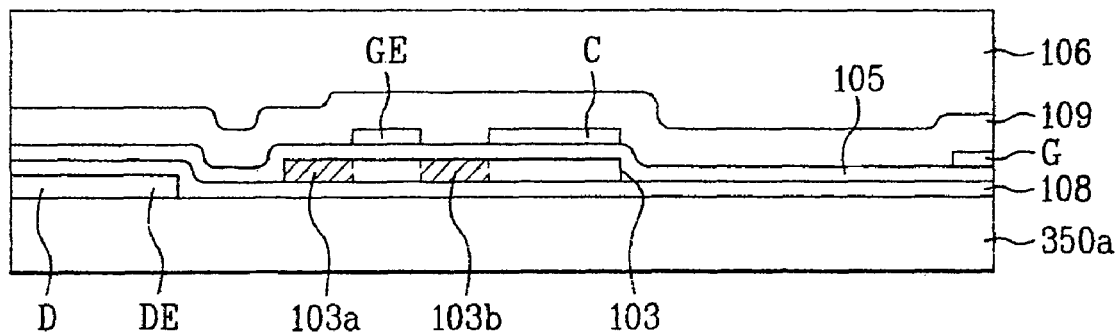

Referring to FIG. 3D, the insulating interlayer 109 and the organic insulating layer 106 are sequentially formed over the entire surface of the first substrate 350a including the gate electrode GE and the common electrode line C to planarize the surface over the first substrate 350a.

Figure 3E:
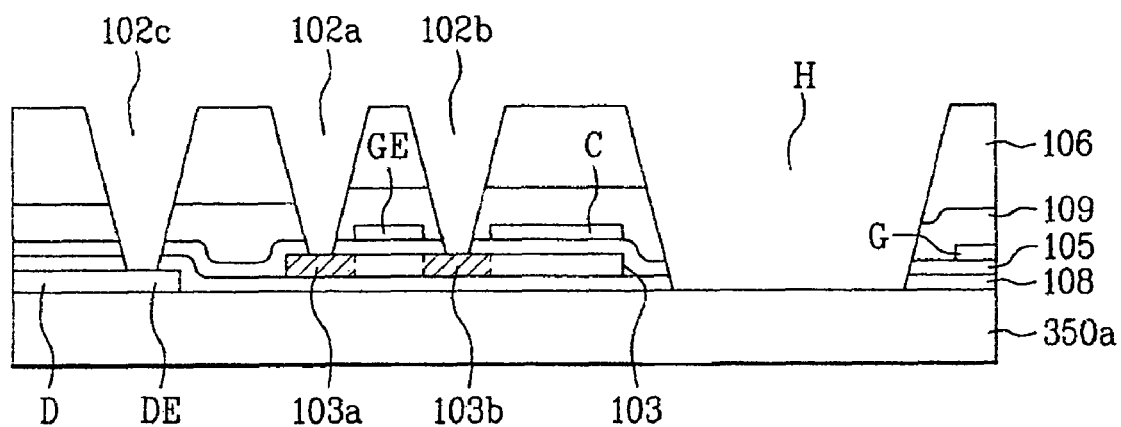

After that, as shown in FIG. 3E, portions of the gate insulating layer 105, the organic insulating layer 106, and the insulating interlayer 109 above the source and drain regions 103a and 103b of the semiconductor layer 103 are removed to form the source contact hole 102a, the drain contact hole 102b. At this time, portions of the gate insulating layer 105, the organic insulating layer 106, the insulating interlayer 109 and the data insulating layer 108 above the data electrode DE are removed to form the data contact hole 102c using a photolithographic process (using a fourth mask). The source contact hole 103a exposes a portion of the source region 103a, the drain contact hole 102b exposes a portion of the drain region 103b, and the data contact hole 102c exposes a portion of the data electrode DE, the gate insulating layer 105, the insulating interlayer 109, and the organic insulating layer 106. During the process of forming the contact holes 102a, 102b, and 102c, the data insulating layer 108, the gate insulating layer 105, and the insulating interlayer, and the organic insulating layer 106, corresponding to the transmitting part 101b of the pixel region, are also removed at the same time, thereby forming the transmitting hole H exposing a portion of the first substrate 350a in the transmitting part 101b.

Figure 3F:
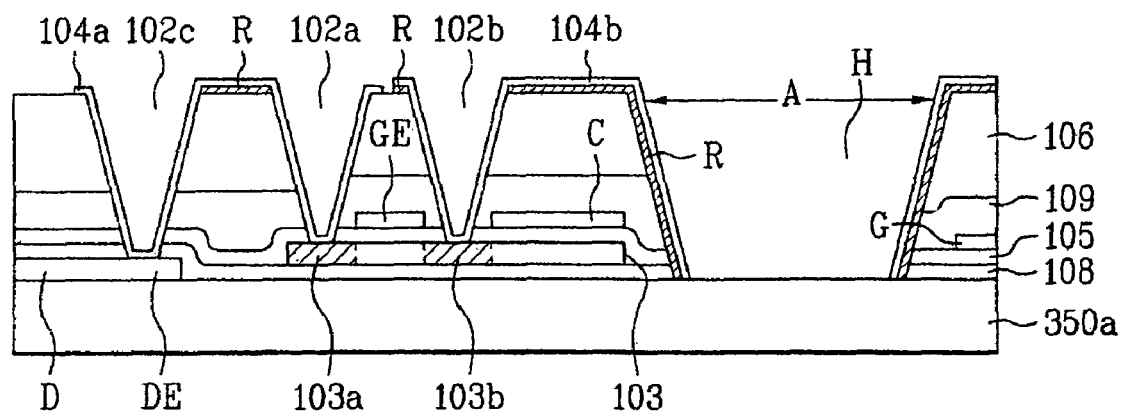

Next, as shown in FIG. 3F, aluminum (Al) or aluminum neodymium (AlNd) is deposited over the entire surface of the first substrate 350a including the organic insulating layer 106, and then patterned by photolithography (using a fifth mask), thereby forming the reflective electrode R having the open portion A corresponding to the transmitting hole H of the transmitting part 101b of the pixel region (using a fifth mask). At this time, the transmitting hole H of the transmitting part 101b and the source and drain contact holes 102a and 102b are patterned to form the reflective electrode R therein.

Then, a transparent conductive layer of indium tin oxide (ITO) is deposited over the entire surface of the first substrate 350a including the reflective electrode R and the source and drain contact holes 102a and 102b, and is patterned by photolithography (using a sixth mask), thereby forming the pixel electrode 104b and the transparent electrode 104a. At this time, the pixel electrode 104b is electrically connected with the drain region 103b exposed by the drain contact hole 102b, and is formed over the entire surface of the pixel region including the transmitting hole H of the transmitting part 101b. Also, the transparent electrode 104a electrically connects the data electrode DE exposed by the data contact hole 102c with the source region 103a of the semiconductor layer exposed by the source contact hole 102a. In this case, the pixel electrode 104b and the transparent electrode 104a are formed at the same time, and are not connected with each other.

Subsequently, the first and second substrates 350a and 350b are bonded to each other, and liquid crystal is injected between the first and second substrates 350a and 350b to thereby form a liquid crystal layer between the first and second substrates. In the transflective type LCD device according to an embodiment of the present invention, the transparent electrode 104a is thin. Thus, the transparent electrode 104a may be damaged during the fabrication process. Further, the transparent electrode 104a has the disadvantageous characteristics of high contact resistance. To overcome this problem, the transparent electrode 104a may be formed of the same material as the reflective electrode R.

Figure 4:
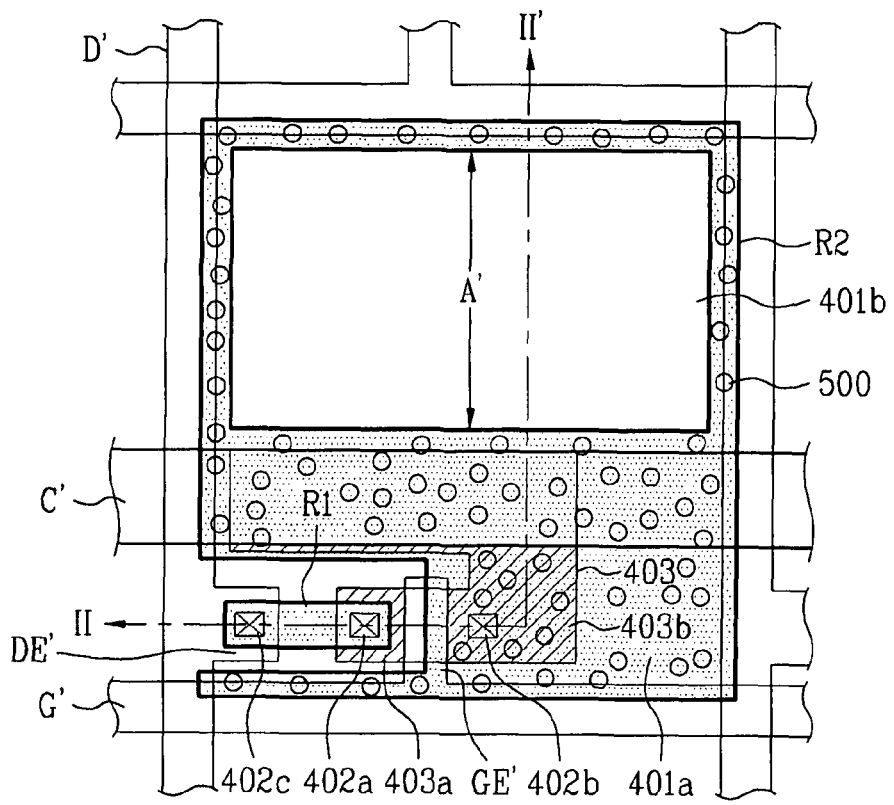
FIG. 4 is a plane view of one pixel region of a transflective type LCD device according to an embodiment of the present invention.
Figure 5:
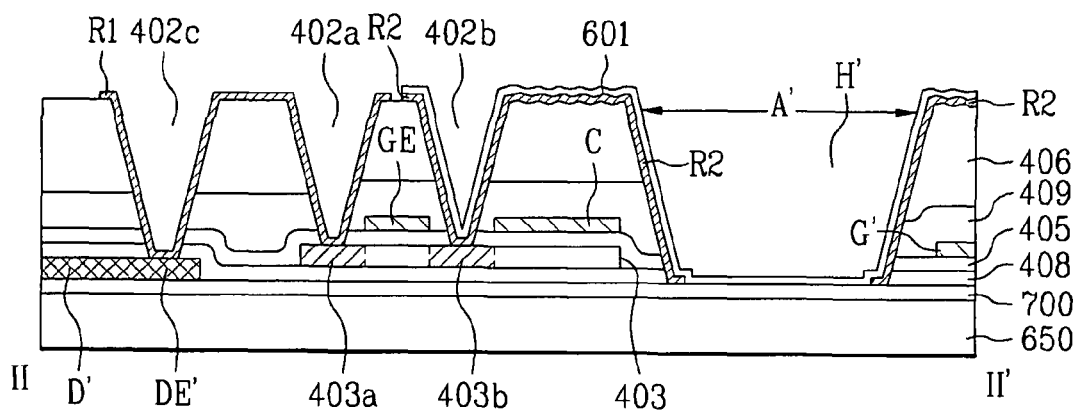
FIG. 5 is a cross-sectional view along II-II' of FIG. 4.

A transflective type LCD device according to an embodiment of the present invention will be described with reference to FIGS. 4 and 5. FIG. 4 is a plane view of one pixel of a transflective type LCD device according to an embodiment of the present invention. FIG. 5 is a cross-sectional view along II-II' of FIG. 4. In the transflective type LCD device according to an embodiment of the present invention, a second substrate has the same structure as that of the transflective type LCD device of the embodiment of the present invention shown in FIGS. 1 and 2. Thus, the explanation of the second substrate will be omitted.

As shown in FIG. 4 and FIG. 5, the transflective type LCD device includes a substrate 650, a buffer layer 700, a data line D', a data electrode DE', a data insulating layer 408, a semiconductor layer 403, a gate insulating layer 405, a gate line G', a gate electrode GE', a common electrode line C', an insulating interlayer 409, an organic insulating layer 406, source and drain contact holes 402a and 402b, a data contact hole 402c, a transmitting hole H', a first reflective electrode R1 a second reflective electrode R2, and a pixel electrode 601. The substrate 650 has a plurality of pixel regions. Each pixel region has a reflective part 401a and a transmitting part 401b. The buffer layer 700 is formed on the entire surface of the substrate 650. The buffer layer 700 may be one of a silicon nitride ($SiN_x$) layer and a silicon nitro-oxide (SiNxOy) layer. The data line D' is formed on the buffer layer 700, the data electrode DE' extends from the data line D' and protrudes into the pixel region, and the data insulating layer 408 is formed over the entire surface of the substrate 650 including the data line D' and the data electrode DE'.

Then, the semiconductor layer 403 having source and drain regions 403a and 403b is formed on the data insulating layer 408. The gate insulating layer 405 is formed over the entire surface of the substrate 650 including the semiconductor layer 403. After that, the gate line G' is formed perpendicular to the data line D' on the gate insulating layer 405, and the gate electrode GE' protruding from the gate line G' is formed on the gate insulating layer 405 above a channel region of the semiconductor layer 403. The common electrode line C' partially overlaps the semiconductor layer 403 and is formed on the gate insulating layer 405. Thereafter, the insulating interlayer 409 and the organic insulating layer 406 are sequentially formed over an entire surface of the gate insulating layer 405 including the gate electrode GE' and the common electrode line C'.

The source and drain contact holes 402a and 402b penetrate through the organic insulating layer 406, the insulating interlayer 409, and the gate insulating layer 405 to expose portions of the source and drain regions 403a and 403b of the semiconductor layer 403. Also, the data contact hole 402c penetrates through the organic insulating layer 406, the insulating interlayer 409, the gate insulating layer 405, and the data insulating layer 408 to exposes a portion of the data electrode DE'. The transmitting hole H' penetrates through the gate insulating layer 405, the data insulating layer 408, the insulating interlayer 409 and the organic insulating layer 406 formed in the transmitting part 401b of the substrate 650, and exposes some of the substrate 650.

The first reflective electrode R1 electrically connects the source region 403a of the semiconductor layer 403 with the data electrode DE' through the source and data contact holes 402a and 402c. The second reflective electrode R2 is formed on the organic insulating layer 406 in the reflective part. The second reflective electrode R2 contacts the drain region 403b via the drain contact hole 402b. The pixel electrode 601 is formed on the second reflective electrode R2 including the transmitting hole H' of the transmitting part 401b in the pixel region.

During an etching process of forming the transmitting hole H', the buffer layer 700 prevents the substrate from being etched. That is, since the transmitting hole H' has a large size, the organic insulating layer 406, the insulating interlayer 409, the gate insulating layer 405, and the data insulating layer 408 are etched in a large range during the etching process of forming the transmitting hole H'. Accordingly, the surface of the substrate 650 may be etched by an etchant such that the substrate 650 may be damaged. In this respect, the buffer layer 700 between the gate insulating layer 405 and the substrate 650 prevents the etchant from contacting the surface of the substrate 650, thereby preventing the substrate 650 from being damaged by the etchant.

For example, the first and second reflective electrodes R1 and R2 may be formed of a metal material having high reflectance, low contact resistance, and high degree of strength, such as aluminum (Al), and aluminum neodymium (AlNd). The first reflective electrode R1 electrically connects the source region 403a of the semiconductor layer 403 with the data electrode DE' via the data contact hole 402c and the source contact hole 402a. As described above, the first reflective electrode R1 is formed of a metal material having low resistance such that the first reflective electrode R1 is connected with the source region 403a and the data line D' with a low contact resistance. Accordingly, electric signals provided from the data line D' are easily transmitted to the source region 403a of the semiconductor layer 403.

The first and second reflective electrodes R1 and R2 have uneven surfaces 500 to reflect the external light incident on the first and second reflective electrodes R1 and R2 diffusively. Also, the second reflective electrode R2 has an open portion A' corresponding to the transmitting hole H' of the transmitting part 401b, and the second reflective electrode R2 partially overlaps portions of the gate line G' and the data line D'.

A method for fabricating the transflective type LCD device according to an embodiment of the present invention will be described with reference FIGS. 6A to 6G. FIG. 6A to FIG. 6G are cross-sectional views of a method for fabricating the transflective type LCD device according to an embodiment of the present invention.

Figure 6A:
FIG. 6A to FIG. 6G are cross sectional views of a method for fabricating a transflective type LCD device according to an embodiment of the present invention.

First, the substrate 650 having the plurality of pixel regions is prepared. Each pixel region has a reflective part 401a and a transmitting part 401b. Subsequently, as shown in FIG. 6A, the buffer layer 700, such as silicon nitride (SiNx) and silicon nitro-oxide (SiNxOy), is formed on the entire surface of the substrate 650. The buffer layer 700 is formed to prevent the substrate 650 from being damaged by the etchant during the process of forming the transmitting hole H'.

Figure 6B:
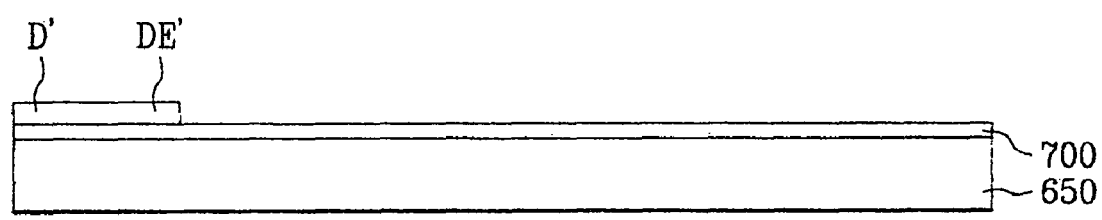

After that, as shown in FIG. 6B, the metal layer of aluminum (Al) is deposited over the entire surface of the substrate 650 including the buffer layer 700, and then selectively patterned by photolithography (using a first mask), thereby forming the data line D' and the data electrode DE'.

Figure 6C:
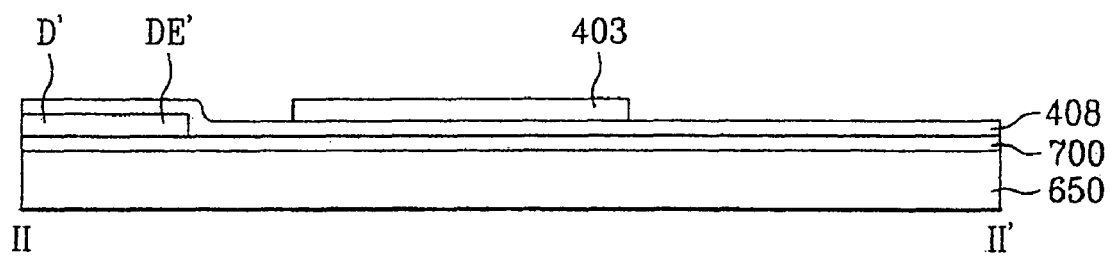

Referring to FIG. 6C, the data insulating layer 408 is formed over the entire surface of the substrate 650 including the data line D' and the data electrode DE'. Then, a silicon layer is deposited over the entire surface of the substrate 650 including the data insulating layer 408, and selectively patterned by photolithography (using a second mask), thereby forming the island-shaped semiconductor layer 403.

Figure 6D:
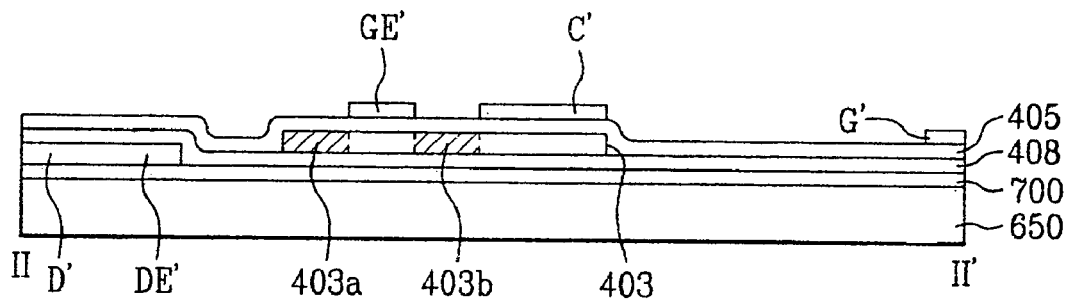

Subsequently, as shown in FIG. 6D, an insulating layer, such as silicon oxide and silicon nitride, is formed over the entire surface of the substrate 650 including the semiconductor layer 403, thereby forming the gate insulating layer 405. Thereafter, a metal layer, such as aluminum (Al), aluminum neodymium (AlNd), and chrome (Cr), is formed over the entire surface of the substrate 650 including the gate insulating layer 405, and then selectively patterned by photolithography (using a third mask), thereby forming the gate line G' and positioning the gate electrode GE of the gate line G on the gate insulating layer 405 in correspondence with the channel region of the semiconductor layer 403. Simultaneously, the common electrode line C' is formed in parallel with the gate line G' to overlap the semiconductor layer 403.

Next, impurity ions are implanted into the semiconductor layer 403 using the gate electrode GE' and the common electrode line C' as a mask. Exposed side portions of the semiconductor layer 403 are formed as the source and drain regions 403a and 403b by implantation of impurity ions. Thus, a middle portion of the semiconductor layer 403, covered with the gate electrode GE' is formed as a channel region.

Figure 6E:
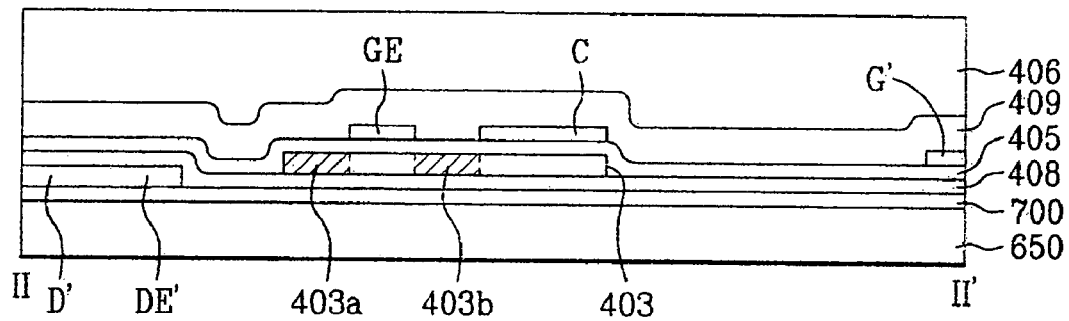

Subsequently, as shown in FIG. 6E, the insulating interlayer 409 and the organic insulating layer 406 are sequentially formed over the entire surface of the substrate 650 including the gate electrode GE' and the common electrode line C' to planarize the surface over the substrate 650.

Figure 6F:
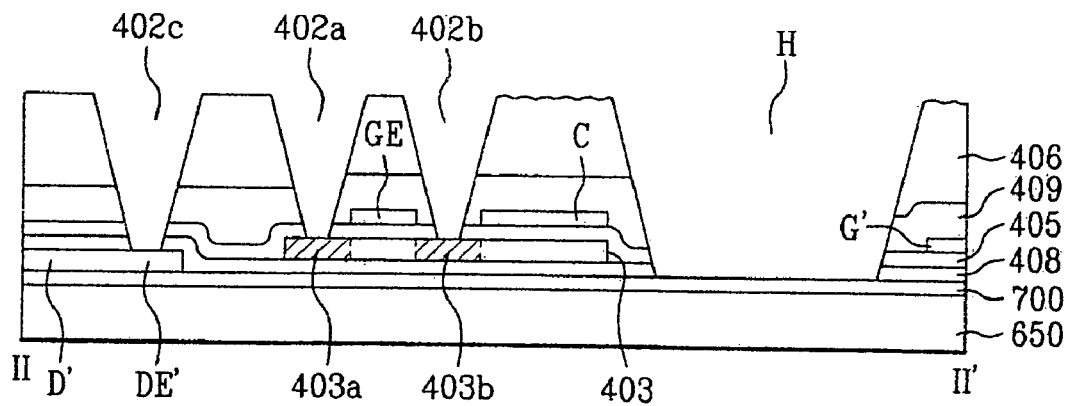

Referring to FIG. 6F, the source contact hole 402a and the drain contact hole 402b are formed by removing portions of the gate insulating layer 405, the organic insulating layer 406, and the insulating interlayer 409 above the source region 403a and drain region 403b using a photolithography process (using a fourth mask). In this process, the data contact hole 402c is also formed by removing portions of the gate insulating layer 405, the organic insulating layer 406, the insulating interlayer 409, and the data insulating layer 408 above the data electrode DE' using a photolithography process (using a fourth mask). More specifically, the source contact hole 403a exposes a portion of the source region 403a, the drain contact hole 403b exposes a portion of the drain region 403b, and the data contact hole 402c exposes a portion of the data electrode DE'. During the process of forming the respective contact holes 402a, 402b, and 402c, the data insulating layer 408, the gate insulating layer 405, and the insulating interlayer 409, and the organic insulating layer 406, corresponding to the transmitting part 401b of the pixel region, are removed at the same time, thereby forming the transmitting hole H' and exposing the buffer layer 700 of the transmitting part 401b. At this time, the buffer layer 700 prevents the substrate 650 from being damaged by the etchant used for the process of forming the transmitting hole H'. That is, since the etchant could have penetrated into the substrate 650 by excessive etching, the buffer layer 700 is formed between the substrate 650 and the gate insulating layer 405 to prevent the etchant from penetrating into the substrate 650. In this case, the organic insulating layer 406 may have the uneven surface 500 formed by photolithography (a fifth mask).

Figure 6G:
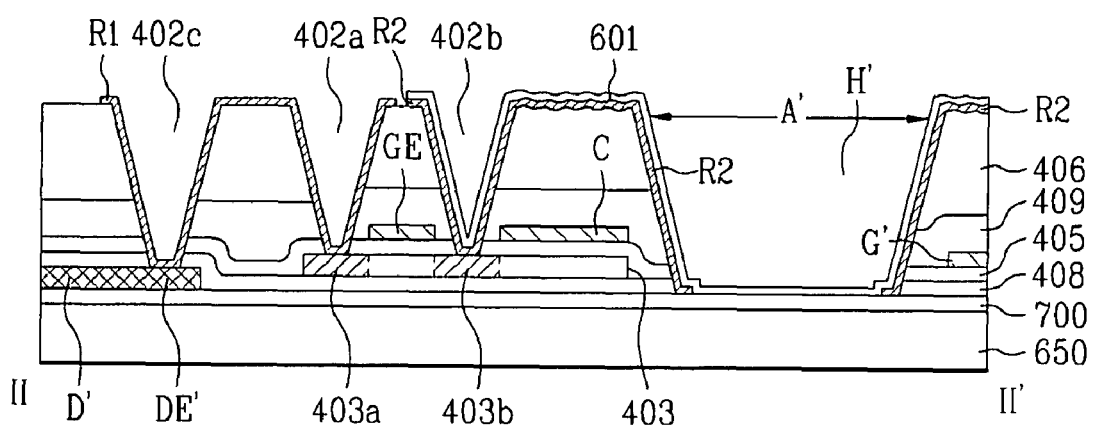

After that, as shown in FIG. 6G, aluminum (Al) or aluminum neodymium (AlNd) is deposited over the entire surface of the substrate 650 including the organic insulating layer 406, and patterned by photolithography (using a sixth mask), thereby forming the first reflective electrode R1 and the second reflective electrode R2. The first reflective electrode R1 electrically connects the source region 403a of the semiconductor layer 403 with the data electrode DE' through the data contact hole 402c and the source contact hole 402a. The second reflective electrode R2 electrically connects the drain region 403b of the semiconductor layer 403 through the drain contact hole 402b. Also, the second reflective electrode R2 has the open part A' corresponding to the transmitting hole H' of the transmitting part of the pixel region. In this case, the second reflective electrode R2 is not formed in the transmitting hole H' of the transmitting part 401b.

The first and second reflective electrodes R1 and R2 are formed on the organic insulating layer 406 having the uneven surface 500 such that the first and second reflective electrodes R1 and R2 have an uneven surface. The uneven surface 500 of the first and second reflective electrodes R1 and R2 diffusively reflects light in the reflective part 401a such that the light is not concentrated at one point.

Next, the transparent conductive layer of ITO is deposited over the entire surface of the organic insulating layer 406 including the first and second reflective electrodes R1 and R2, and the source and drain contact holes 402a and 402b. The transparent conductive layer of ITO is then patterned by photolithography (using a seventh mask) to form the pixel electrode 601 on the second reflective electrode R2 such that the pixel electrode 601 is electrically connected with the drain region 403b of the semiconductor layer 403 via the second reflective electrode 403b. In this case, the pixel electrode 601 is formed in the pixel region including the transmitting hole H' of the transmitting part 401b.

The transflective type LCD device according to an embodiment of the present invention, which has the reflective electrodes R1 and R2 with an uneven surface 500, requires 7 masks. Thus, the fabrication process according to the embodiment of the present invention shown in FIGS. 3A to 3F requires one more mask as compared with the fabrication process according to the embodiment of the present invention shown in 6A to 6G that uses 6 masks. However, since the reflective electrodes R1 and R2 have the uneven surface 500, the efficiency in scattering the light is improved.

As mentioned above, the transflective type LCD device according to embodiments of the present invention and the method for fabricating the same have the following advantages. A buffer layer of silicon nitride or silicon nitride-oxide is formed between the substrate and the gate insulating layer to prevent the substrate from being damaged by the etchant used for etching the gate insulating layer and the organic insulating layer for formation of the transmitting hole of the transmitting part. Also, the reflective electrode is formed of the metal material having low contact resistance and high degree of strength such that electric signals are easily transmitted between the source region of the semiconductor layer and the data line.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A transflective type LCD device comprising:
   a substrate having gate and data lines crossing each other to define pixel regions;
   a reflective part and a transmitting part in each pixel region;
   a buffer layer on an entire surface of the substrate and under the data lines;
   a pixel electrode in the reflective part and the transmitting part of the pixel region;
   a thin film transistor including a semiconductor layer having source and drain regions for transmitting a signal of the data line to the pixel electrode in accordance with a signal of the gate line;
   a reflective electrode in the reflective part of the pixel region, and an adjacent region to the thin film transistor, wherein the reflective electrode in the reflective part of the pixel region are connected with the pixel electrode;
   a source contact hole exposing portions of the source region of the semiconductor layer;
   a drain contact hole exposing portions of the drain region of the semiconductor layer;
   a data contact hole exposing portions of a data electrode extends from the data line, wherein the data contact hole is adjacent to source contact hole in a direction parallel to the gate line;
   a data insulating layer formed under the source and drain regions of the semiconductor layer and formed on the data line and the data electrode, which is formed on the buffer layer; and
   an electrode electrically connecting the source region of the thin film transistor exposed by the source contact hole with the data electrode exposed by the data contact hole;
   wherein the electrode includes the reflective electrode in the adjacent region to the thin film transistor, Or includes a transparent electrode connected with the reflective electrode in the adjacent region to the thin film transistor, and
   wherein the pixel electrode formed of an Indium Tin Oxide (ITO) is formed within the drain contact hole to be directly connected to the drain region of the semiconductor layer.

2. The transflective type LCD device of claim 1, further comprising a common electrode line located on the reflective part of the pixel region in parallel with the gate line.

3. The transflective type LCD device of claim 1, wherein the reflective electrode is formed of one of aluminum (Al) and aluminum neodymium (AlNd).

4. The transflective type LCD device of claim 2, further comprising an organic insulating layer disposed below the reflective electrode, having a transmitting hole exposing a portion of the transmitting part, and having the data contact hole, the source contact hole, and the drain contact hole exposing portions of the data electrode, the source region, and the drain region, respectively.

5. The transflective type LCD device of claim 4, wherein the organic insulating layer has an uneven surface on which the reflective electrodes have an uneven surface.

6. The transflective type LCD device of claim 1, wherein the buffer layer includes one of silicon nitride ($SiN_x$) and silicon nitro-oxide (SiNxOy).

7. The transflective type LCD device of claim 1, wherein the pixel electrode is disposed on the reflective electrode.

8. The transflective type LCD device of claim 4, further comprising a gate insulating layer between the gate line and the semiconductor layer of the thin film transistor and an insulating interlayer between the organic insulating layer and the gate insulating layer.

9. The transflective type LCD device of claim 4, wherein the reflective electrode is formed on the organic insulating layer over the common electrode line,
wherein the a cell gap from at the transmitting hole is twice as great as a cell gap at the top of the reflective part.

* * * * *